United States Patent

Niino

[11] Patent Number: 5,714,980
[45] Date of Patent: Feb. 3, 1998

[54] POINTING DEVICE

[75] Inventor: Masanobu Niino, Tokyo, Japan

[73] Assignee: Mitsumi Electric Co., Ltd., Tokyo, Japan

[21] Appl. No.: 692,242

[22] Filed: Aug. 7, 1996

[30] Foreign Application Priority Data

Oct. 31, 1995 [JP] Japan .................. 7-282851

[51] Int. Cl.$^6$ .................................. G09G 5/08
[52] U.S. Cl. .......................... 345/160; 345/157
[58] Field of Search .................. 345/157, 159, 345/160, 161, 184

[56] References Cited

U.S. PATENT DOCUMENTS

| | | | |
|---|---|---|---|
| 4,313,113 | 1/1982 | Thornburg | 345/159 |
| 4,739,128 | 4/1988 | Grisham | 345/161 |
| 5,012,230 | 4/1991 | Yasuda | 345/160 |
| 5,168,221 | 12/1992 | Houston | 345/167 |
| 5,504,502 | 4/1996 | Arita et al. | 345/160 |

Primary Examiner—Regina D. Liang
Attorney, Agent, or Firm—Bardehle, Pagenberg, Dost, Altenburg, Frohwitter, Geissler

[57] ABSTRACT

A compact pointing device of a novel constitution featuring high operability. A disk-like operation unit 4 is disposed on the PC substrate 8 via an annular resilient stopper 7. Magnets 11, 12, 13 and 14 are arranged on the lower surface of the operation unit 4 along the circumference thereof maintaining an angle of 90 degrees. Hall elements 15, 16, 17 and 18 are arranged on the upper surface of the PC substrate 8 opposed to the magnets 11, 12, 13 and 14. A processing circuit is mounted on the PC substrate 8 to convert the changes in the output voltages of the Hall elements 15, 16, 17 and 18 into moving amounts of the cursor in the predetermined directions.

2 Claims, 5 Drawing Sheets

POINTING DEVICE

BACKGROUND OF THE INVENTION

The present invention relates to a pointing device of a computer. More specifically, the invention relates to a pointing device for moving a cursor on a display and to a pointing device for game machines.

DESCRIPTION OF THE PRIOR ART

Conventional pointing devices include a mouse, a track ball, a joy stick, etc. The mouse and the track ball are operated to position the cursor by moving the two rotary encoders for X-axis and Y-axis in contact with a ball that can be rotated in any direction and by converting the rotational angle of the ball into X-Y coordinates on the display. The joy stick has a lever that can be tilted into four directions in which the microswitches are arranged, and the cursor is moved toward a predetermined direction depending upon which switch is turned on.

The mouse and the track ball have an optical mechanism constituted by a rotary encoder, and are relatively expensive and are assembled through cumbersome operation. Besides, since the operation is based upon the friction between the ball and the rotary encoder, skidding often takes place. Lack of durability imposes a problem, too. In the case of the joy stick, the switch is not turned on and the cursor does not move unless the operation lever is reliably tilted, which is a problem from the standpoint of operability. Moreover, limitation due to structure is imposed on further reducing the size of these pointing devices.

There arouse technical problems when it is attempted to improve operability and to reduce the size by employing a pointing device of a novel structure that had not existed thus far. The object of the present invention is to solve such problems.

SUMMARY OF THE INVENTION

The present invention was proposed in order to solve the above-mentioned problems, and provides a pointing device comprising an operation unit which swings up-and-down in any direction, magnets and magnetoelectric conversion elements opposed to each other in the up-and-down direction at a plurality of predetermined positions along the peripheral edge of the operation unit, the distance between the plurality of magnets and the magnetoelectric conversion elements being allowed to change accompanying the swinging motion of the operation unit, and a processing means for converting the amount of change in the voltage of each magnetoelectric conversion element into a moving amount of the cursor in a predetermined direction. The invention further provides a pointing device comprising an operation unit of which the lower end is supported by a bottom board, an outer housing of which the upper board is opened so that the operation unit is exposed through the opening portion, a disk unit provided in the housing at an intermediate portion of the operation unit, the disk unit having a diameter larger than the opening portion, a resilient member interposed between the upper peripheral edge of the disk unit and the lower surface of the upper board of the outer housing enabling the operation unit to swing up-and-down in any direction, magnets and magnetoelectric conversion elements opposed to each other in the up-and-down direction at a plurality of predetermined positions along the peripheral edge of the lower surface of the disk unit, the distance between the plurality of magnets and the magnetoelectric conversion elements being allowed to change accompanying the swinging motion of the operation unit, and a processing means for converting the amount of change in the voltage of each magnetoelectric conversion element into a moving amount of the cursor in a predetermined direction.

Here, when the operation unit is caused to swing in a given direction, the distance between the plurality of magnets and the magnetoelectric conversion elements changes depending upon the swinging direction and the swinging angle. When the distance increases, a decreased amount of the magnetic flux intersects the magnetoelectric conversion elements which then output a decreased voltage. When the distance decreases, on the other hand, an increased amount of magnetic flux intersects the magnetoelectric conversion elements which then output an increased voltage.

In the processing means have been set in advance the moving directions of the cursor corresponding to the individual magnetoelectric conversion elements. The amount of change in the output voltage of the magnetoelectric conversion element is converted into a moving amount in a particular direction determined by the magnetoelectric conversion element for each of the magnetoelectric conversion elements. Consequently, the moving direction and the moving amount of the cursor are determined as the sum of the individual vectors having particular directions and amounts. Thus, the cursor moves in a predetermined direction at a predetermined speed depending upon the swinging direction and the swinging angle of the operation unit.

DESCRIPTION OF THE PREFERRED EMBODIMENTS

Embodiments of the present invention will now be described in detail with reference to FIGS. 1 to 5.

Figure 1:
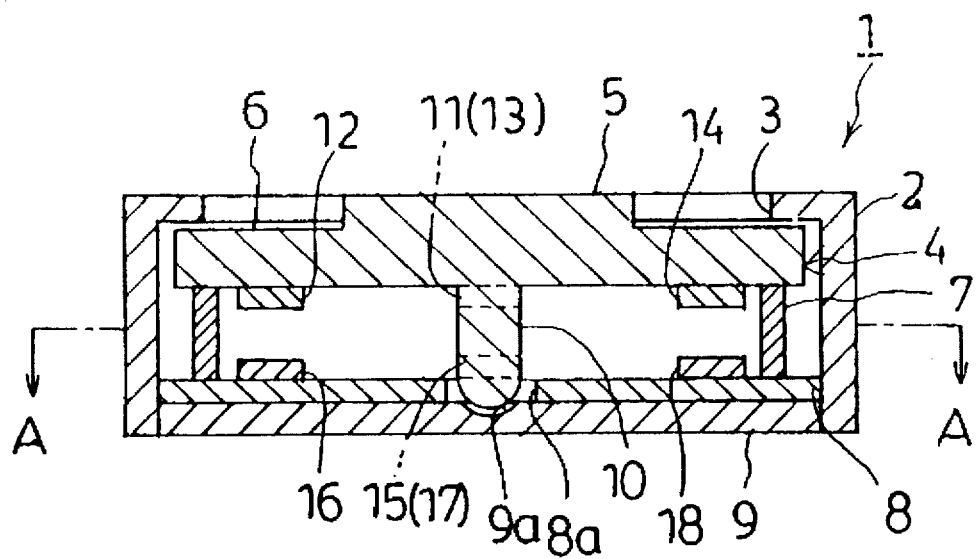
FIG. 1 is a vertical sectional view illustrating an embodiment of the present invention.
Figure 2:
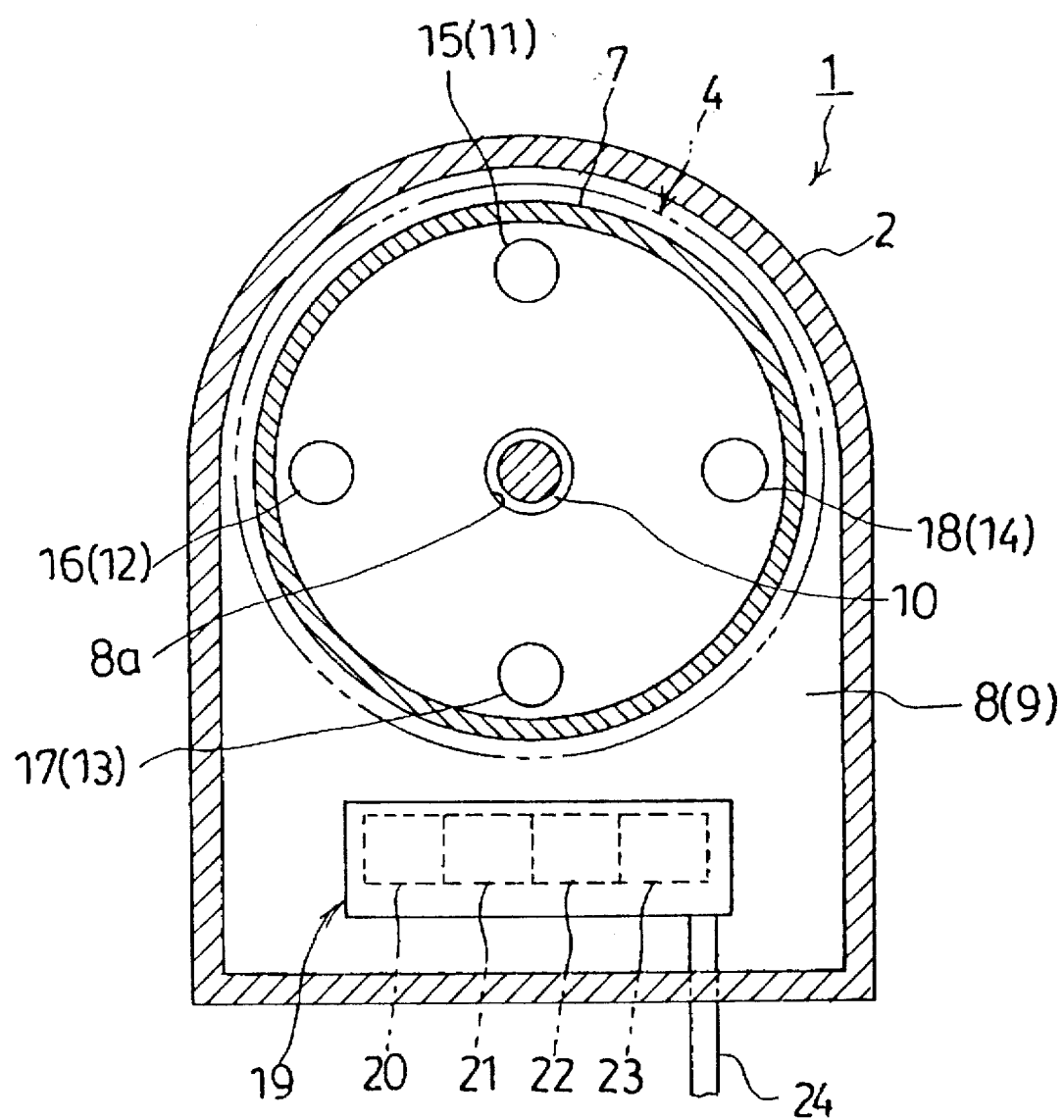
FIG. 2 is a sectional view along the line A—A of FIG. 1.

FIG. 1 is a vertical sectional view of a pointing device 1, and FIG. 2 is a sectional view along the line A—A of FIG. 1.

A circular hole 3 is formed in the upper surface of an upper housing 2 of the pointing device 1, and a disk-like operation unit 4 is exposed through the circular hole 3. The operation unit 4 has a diameter which is slightly greater than the diameter of the circular hole 3, and further has a cylindrical protuberance 5 at the upper central portion thereof. A ring-like recessed portion 6 is formed in the upper surface of the operation unit 4 on the outside of the cylindrical protuberance 5 being partitioned by the peripheral edge of the circular hole 3.

An annular resilient stopper 7 is arranged along the lower peripheral edge of the operation unit 4, a PC substrate 8 is laid under the resilient stopper 7 on the upper surface of a lower housing 9, a round hole 8a is perforated at the center of the PC substrate 8, and a spherical recessed portion 9a is formed in the upper surface of the lower housing 9 opposed to the round hole 8a. From the center on the lower surface of the operation unit 4 is hung a leg pole 10 which penetrates through the round hole 8a. The lower surface of the leg pole 10 is formed in a semispherical shape and is brought as close to the spherical recessed portion 9a as possible. When the cylindrical protuberance 5 is downwardly depressed, therefore, the leg pole 10 is supported by the spherical recessed portion 9a, and the operation unit 4 remains still. On the other hand, when the ring-like recessed portion 6 is depressed at any position in any direction, the lower surface of the leg pole 10 rotates along the spherical recessed portion 9a and the elastic stopper 7 contracts in a direction in which it is depressed. Therefore, the operation unit 4 swings down about a fulcrum at which the upper surface of the operation unit 4 of the side opposite to the depressed side comes into contact with the peripheral edge of the circular hole 3. When the depressing operation is discontinued, the operation unit 4 returns to the initial equilibrium state due to the reaction of the resilient stopper 7. Here, the round hole 8a is formed in the PC substrate 8, and the lower surface of the leg pole 10 is opposed to the spherical recessed portion 9a of the lower housing 9, so that the lower surface of the leg pole 10 that slides on the PC substrate 8 will not cause the PC substrate 8 to be scarred.

Four magnets 11, 12, 13 and 14 are arranged maintaining an angle of 90 degrees on the lower surface of the operation unit 4 just under the ring-like recessed portion 6. Hall elements 15, 16, 17 and 18 are arranged on the upper surface of the PC substrate 8 opposed to the magnets 11, 12, 13 and 14. On the PC substrate 8 is mounted a processing circuit 19 on the outer side of the Hall elements 15, 16, 17 and 18. Though not diagramed, the outputs of the Hall elements 15, 16, 17 and 18 are wired in parallel to the processing circuit 19. The processing circuit 19 is divided into four processing units, i.e., $y^+$-direction processing unit 20, $x^-$-direction processing unit 21, $y^-$-direction processing unit 22 and $x^+$-direction processing unit 23 depending upon the outputs of the four Hall elements 15, 16, 17 and 18. The processing units 20, 21, 22 and 23 have functions for converting the output voltages of the Hall elements 15, 16, 17 and 18 into moving amounts in the upward direction ($y^+$-direction), leftward direction ($x^-$-direction), downward direction ($y^-$-direction) and rightward direction ($x^+$-direction) of the cursor on the display, and for outputting them to the CPU through a code 24.

Concretely speaking, when the output voltages $V_{y+}$, $V_{x-}$, $V_{y-}$ and $V_{x+}$ of the Hall elements 15, 16, 17 and 18 become greater than the output voltages $V_{y+0}$, $V_{x-0}$, $V_{y-0}$, $V_{x+0}$ of when the pointing device 1 is in an equilibrium state (the ring-like recessed portion 6 has not been depressed at any of the portion thereof), digital signals are output to move the cursor in the respective directions depending upon the amount of increase. The density of the digital signals increases with an increase in the output voltage, and the cursor moves at an increased speed in the respective directions.

When the upper side of the ring-like recessed portion 6 (direction in which the magnet 11 is disposed) is depressed, the opposite side of the operation unit 4 (direction in which the magnet 13 is disposed) floats and comes into contact with the peripheral edge of the circular hole 3, and swings down with the contacting portion as a fulcrum of turn. The magnet 11 approaches the opposing Hall element 15. The magnetic flux emitted from the magnet 11 intersects the Hall element 15 in an increased amount when the distance is small between the magnet 11 and the Hall element 15. The output voltage of the Hall element varies in proportion to the amount of the magnetic flux that is intersecting. Therefore, the output voltage $V_{y+}$ of the Hall element 15 increases depending upon the swinging angle of the operation unit 4 toward the upper direction, i.e., depending upon the depressing force exerted on the upper side of the ring-like recessed portion 6. Then, the $y^+$-direction processing unit 20 outputs a signal for moving the cursor upwards ($y^+$-direction). At this moment, the right and left magnets 12 and 14 are slightly turned down to approach the Hall elements 16 and 18. However, the output voltages $V_{x-}$ and $V_{x+}$ of these Hall elements 16 and 18 are increased by an equal amount and, hence, a signal for moving the cursor leftwards ($x^-$-direction) cancels a signal for moving the cursor rightwards ($x^+$-direction). As a result, the cursor moves upwards ($y^+$-direction) at a speed which increases in proportion to the depressing force exerted on the upper side of the ring-like recessed portion 6.

Similarly, the cursor moves leftwards ($x^-$-direction) when the left side of the ring-like recessed portion 6 (direction in which the magnet 12 is arranged) is depressed, the cursor moves downwards ($y^-$-direction) when the lower side of the ring-like recessed portion 6 is depressed, and the cursor moves rightwards ($x^+$-direction) when the right side of the ring-like recessed portion 6 is depressed. Furthermore, the moving speed of the cursor in the respective directions increases or decreases depending upon the force for depressing the ring-like recessed portion 6.

Next, when an oblique portion of the ring-like recessed portion 6 is depressed, e.g., when a portion deviated in the clockwise direction by 30 degrees from the upper side is depressed, the magnets 11 and 14 approach the Hall elements 15 and 18, whereby the output voltages $V_{y+}$ and $V_{x+}$ increase, and a ratio of increments $\Delta V_{y+}$ and $\Delta V_{x+}$ becomes $\Delta V_{y+}:\Delta V_{x+}$=about 1.73:1 in proportion to the distance between the magnets 11, 14 and the Hall elements 15, 18. Therefore, the direction in which the cursor moves on the display is determined as a resultant vector of a magnitude of about 1.73 in the upward direction ($y^+$-direction) and a vector of a magnitude of 1 in the rightward direction ($x^+$-direction). As a result, the cursor moves in a direction which is deviated in the clockwise direction by 30 degrees from the upward direction ($y^+$-direction).

Thus, when the ring-like recessed portion 6 is depressed at any portion in any direction, the cursor moves on the display in the same direction in which the ring-like recessed portion 6 was depressed. Moving speed increases with an increase in the depressing force.

According to the above-mentioned embodiment, four magnets 11, 12, 13 and 14 are arranged maintaining an angle of 90 degrees on the lower surface of the operation unit 4. However, the lower surface of the operation unit 4 may be entirely magnetized. Besides, the cursor may be moved by using analog signals without converting them into digital signals. Only two Hall elements may be installed as designated, for example, at 15 and 16, one Hall element 15 controlling the cursor in the up-and-down directions ($y^+$- and $y^-$-directions) and the other Hall element 16 controlling the cursor in the right-and-left directions ($x^-$- and $x^+$-directions). In this case, the output voltage $V_{x-}$ of the Hall element 16 increases when the left side of the ring-like recessed portion 6 is depressed, and the output voltage $V_{x-}$ of the Hall element 16 decreases when the right side of the ring-like recessed portion 6 is depressed. Therefore, the cursor moves leftwards ($x^-$-direction) when the output voltage $V_{x-}$ becomes larger than the output voltage $V_{x-0}$ from the Hall element 16 in the equilibrium state, and the cursor moves rightwards ($x^+$-direction) when the output voltage $V_{x-}$ decreases. The same also holds even in the up-and-down directions. Thus, the vector can be recognized in all circumferential directions depending upon the increase or decrease of the output voltages of the two x- and y-channels with respect to the equilibrium state.

Figure 3:
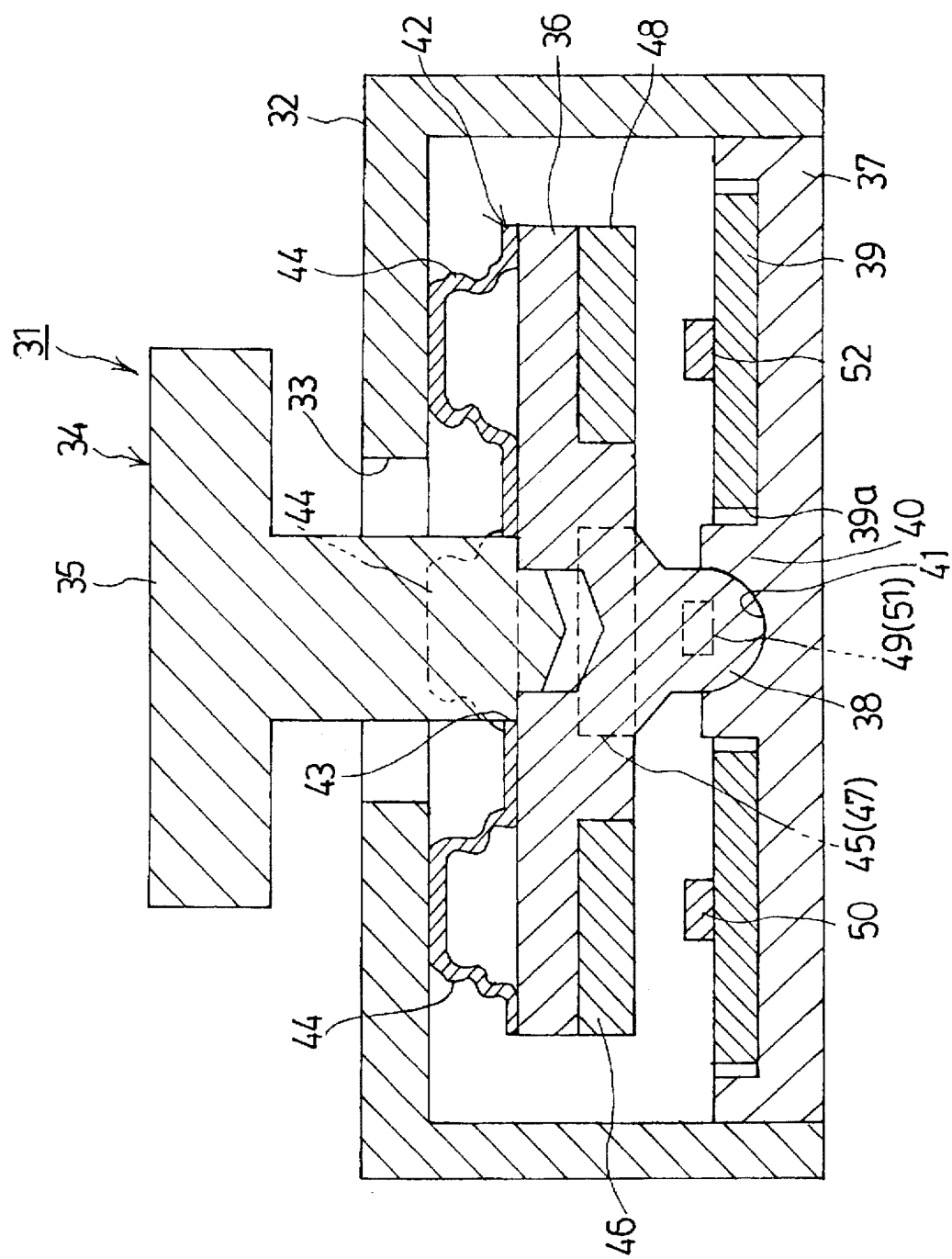
FIG. 3 is a vertical sectional view illustrating an embodiment of the present invention.

FIG. 3 illustrates a pointing device 31 according to an embodiment of the invention. A circular opening portion 33 is formed in the upper plate of an upper housing 32 of the pointing device 1, and an operation unit 34 protrudes through the opening portion 33. The operation unit 34 includes a knob 35 and a disk unit 36 which is fitted to the lower end of the knob 35. The disk unit 36 is accommodated in an outer housing of the pointing device 31 which comprises an upper housing 32 and a lower housing 37. A semispherical dowel 38 is formed at the center on the lower surface of the disk unit 36.

A PC substrate 39 is laid on the upper surface of the lower housing 37, a round hole 39a is formed at the center of the PC substrate 39, and a boss 40 of a diameter smaller than that of the round hole 39a is formed on the upper surface of the lower housing 37 opposed to the round hole 39a. Moreover, a dowel receptacle 41 is formed in a recessed manner in the upper surface of the boss 40, and the dowel 38 is engaged with the dowel receptacle 41 so as to rotate.

Figure 4:
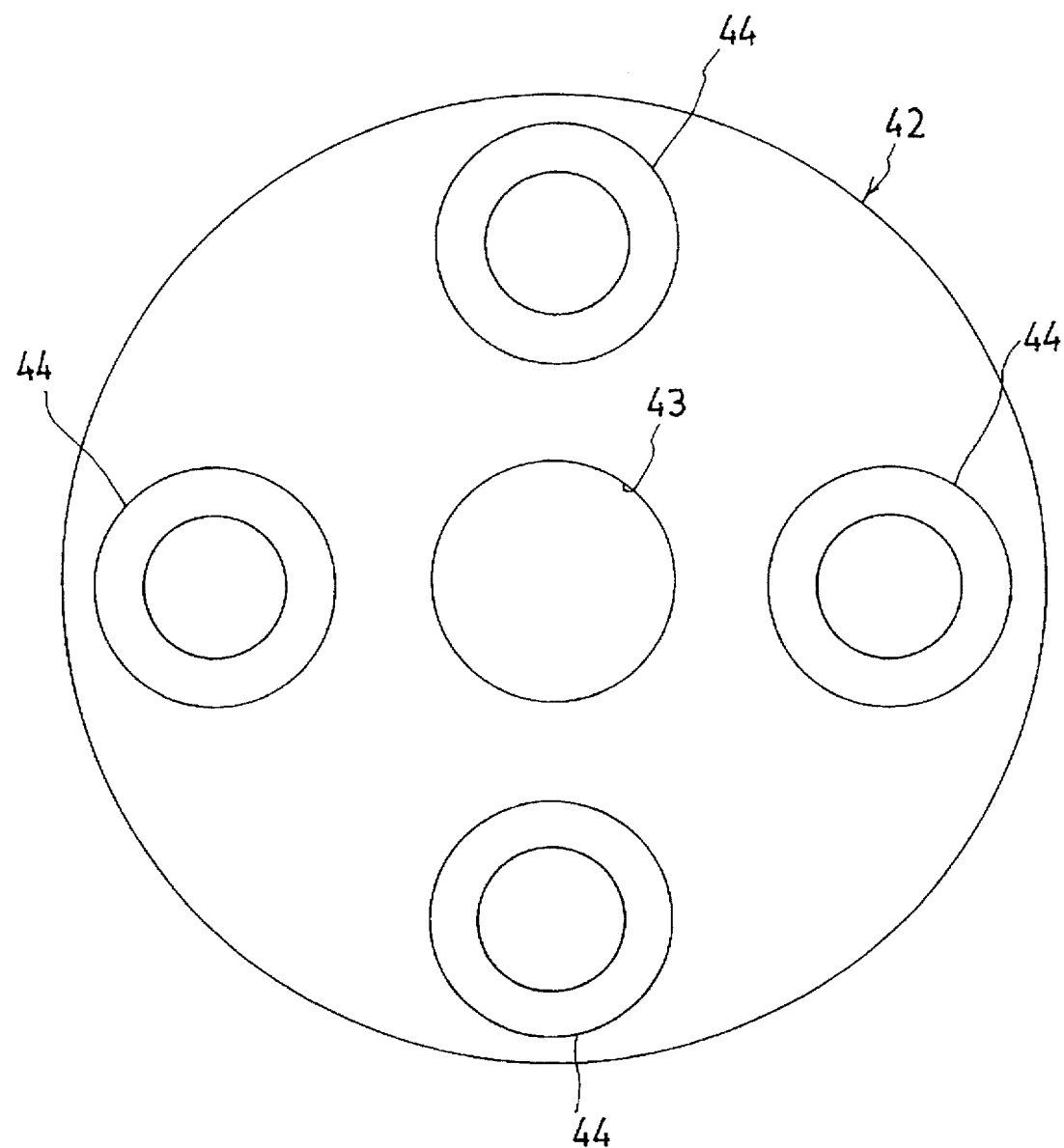
FIG. 4 is a plan view of a rubber of FIG. 3.

A rubber 42 is laid on the upper surface of the disk unit 36. As shown in FIG. 4, the rubber 42 has, at the center thereof, a hole 43 in which the lower end of the knob 35 will be inserted, and has four diaphragms 44, 44,—that are swollen in the shape of a circular truncated cone along the peripheral edge thereof maintaining an angle of 90 degrees. The diaphragms 44, 44,—have such a height that the distance is the greatest between the lower surface of the upper plate of the upper housing 32 and the upper surface of the disk portion 36 which is in an equilibrium state. In an equilibrium state as shown in FIG. 3, therefore, the upper surfaces of the diaphragms 44, 44,—are pushed to the upper plate of the upper housing 32, and the side surfaces thereof contract like a bellows. Therefore, the diaphragms 44, 44,—downwardly urge the operation unit 34, and the dowel 38 comes into contact with, and is supported by, the dowel receptacle 41 at all times.

Unlike in the embodiment described with reference to FIGS. 1 and 2, therefore, the operation unit does not float with respect to the upper housing or the lower housing, and is prevented from rattling. In the embodiment shown in FIGS. 1 and 2, the operation unit 4 is prevented from rattling when it is brought into contact with the upper housing 2 by exerting a pressure on the resilient stopper 7 in the up-and-down direction but, instead, the lower surface of the leg pole 10 separates away from the spherical recessed portion 9a. Therefore, the operation unit 4 that is operated descends by a separated distance to impair the operability. The constitution of this embodiment, however, does not arouse such a problem.

When the knob 35 is tilted in any direction, the dowel 38 turns in the dowel receptacle 41, and the operation unit 34 is tilted, too, as a unitary structure. When the knob 35 is liberated, the operation unit 34 returns to the initial equilibrium state due to the action of the rubber 42. Thus, the operation unit 34 is allowed to swing up and down in all directions.

Like in the embodiment shown in FIGS. 1 and 2, four magnets 45, 46, 47 and 48 are arranged along the peripheral edge on the lower surface of the disk unit 36 maintaining an angle of 90 degrees, and Hall elements 49, 50, 51 and 52 are arranged on the upper surface of the PC substrate 39 to be opposed to the magnets 45, 46, 47 and 48, the Hall elements 49, 50, 51 and 52 being connected to a processing circuit (not shown). The processing circuit is constituted in the same manner as the processing circuit 19 of FIG. 2.

Even in this embodiment, the lower surface of the disk unit 36 may be entirely magnetized, or the disk unit 36 may be formed of a magnet.

Thus, when the knob 35 is tilted in any direction, the cursor moves in the same direction on the display. The moving speed increases with an increase in the angle of inclination of the knob 35.

Figure 5:
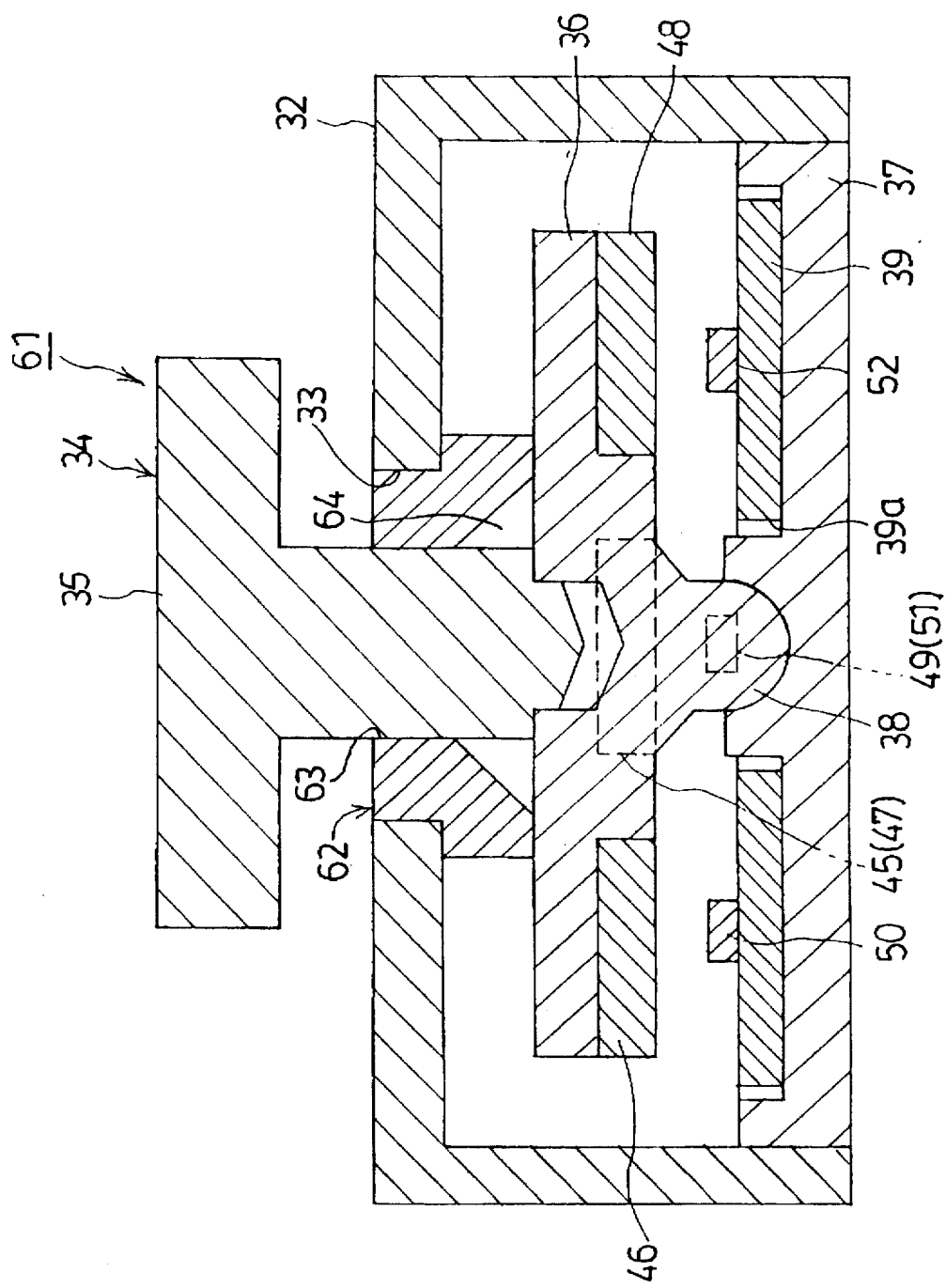
FIG. 5 is a vertical sectional view illustrating another embodiment of the present invention.

FIG. 5 illustrates a pointing device 61 according to another embodiment of the invention of claim 2. What makes a difference between the pointing device 61 and the above-mentioned pointing device 31 is only the constitution of the rubber. Therefore, the portions other than the rubber are denoted by the same reference numerals as those of the above-mentioned pointing device 31 and their description is not repeated.

The rubber 62 of the pointing device 61 is formed in an up-and-down two-stage cylindrical form, and the knob 35 is inserted in the hole 63 at the center. The diameter of the hole 63 gradually increases downwards from near the central portion thereof to thereby form a conical opening 64. The conical opening 64 is to facilitate the swinging motion of the operation unit 34. The upper stage of the rubber 62 is fitted to the opening portion 33 of the upper housing 32, and the lower stage is formed to be slightly larger than the diameter of the opening portion 33 so as to be anchored to the lower edge portion of the opening portion 33. The lower surface of the rubber 62 is in contact with the upper surface of the disk unit 36 to downwardly depress the disk unit 36.

Thus, the pointing device 61 prevents the operation unit from rattling like in the above-mentioned pointing device 31.

The present invention can be modified in a variety of ways without departing from the spirit and scope of the invention, and it should be noted that the invention encompasses even such modified embodiments, as a matter of course. The "resilient member" in the invention of claim 2 is not limited to the rubber 42 or 62 in the above-mentioned embodiment, but may be a coil spring, a leaf spring, or the like.

According to the present invention as described above, the magnets and the magnetoelectric conversion elements are arranged being opposed to each other at predetermined positions, so that the cursor can be moved in any direction. Therefore, the pointing device of the invention can be assembled at a reduced cost and easily compared with the conventional mouse or track ball of the optical system. Besides, the pointing device of the non-contacting system features increased durability and reliability, and is little affected by a change in the environment such as temperature and humidity.

Moreover, the pointing device responds to even a small change in the magnetic field caused by the swinging motion, and features high degree of operability eliminating such a problem in operation that the cursor does not move due to skidding of the ball that takes place in the mouse or in the track ball or that the cursor does not move unless the operation rod is tilted up to a predetermined angle which happens with the joy stick.

Since the cursor can be moved in a direction in which the operation unit is caused to swing, little space is needed for the swinging operation and the pointing device itself can be constructed in a size which is as small and thin as possible. Since the speed for moving the cursor can be increased or decreased depending upon the swinging angle of the operation unit, furthermore, the device offers increased utility value such as increased degree of amusement when it is used for game machines.

When the operation unit is constituted as in the invention of claim 2, furthermore, the operation unit is prevented from rattling and the operability is further improved.

I claim:

1. A pointing device comprising an operation unit of which the lower end is supported by a bottom board, an outer housing of which the upper board is opened so that said operation unit is exposed through the opening portion, a disk unit provided in the housing at an intermediate portion of said operation unit, the disk unit having a diameter larger than the opening portion, a resilient member interposed between the upper peripheral edge of the disk unit and the lower surface of the upper board of the outer housing enabling said operation unit to swing up-and-down in any direction, magnets and magnetoelectric conversion elements opposed to each other in the up-and-down direction at a plurality of predetermined positions along the peripheral edge of the lower surface of said disk unit, the distance between the plurality of magnets and the magnetoelectric conversion elements being allowed to change accompanying the swinging motion of said operation unit, and a dowel receptacle is formed in a recessed manner on a lower housing, the dowel which is formed on the center on the lower surface of the disk unit is engaged with the said dowel receptacle so as to rotate, and plurality of diaphragms are formed along the peripheral edge of said resilient member, the upper plate of the diaphragms is pushed to the upper plate of the upper housing in an equilibrium state, and a processing means for converting the amount of the change in the voltage of each magnetoelectric conversion element into a moving amount of the cursor in a predetermined direction.

2. A pointing device comprising an operation unit of which the lower end is supported by a bottom board, an outer housing of which the upper board is opened so that said operation unit is exposed through the opening portion, a disk unit provided in the housing at an intermediate portion of said operation unit, the disk unit having a diameter larger than the opening portion, a resilient member interposed between the upper peripheral edge of the disk unit and the lower surface of the upper board of the outer housing enabling said operation unit to swing up-and-down in any direction, magnets and magnetoelectric conversion elements opposed to each other in the up-and-down direction at a plurality of predetermined positions along the peripheral edge of the lower surface of said disk unit, the distance between the plurality of magnets and the magnetoelectric conversion elements being allowed to change accompanying the swinging motion of said operation unit, and a dowel receptacle is formed in a recessed manner on a lower housing, the dowel which is formed on the center on the lower surface of the disk unit is engaged with the said dowel receptacle, and said resilient member is formed in an up-and-down two-stage cylindrical form, the upper stage is fired to the opening portion of the upper housing, and the lower stage is formed to be slightly larger than the diameter of the opening portion, the lower surface of said resilient member is in contact with the upper surface of the disk unit, and a processing means for converting the amount of the change in the voltage of each magnetoelectric conversion element into a moving amount of the cursor in a predetermined direction.

* * * * *